Dec. 15, 1970  E. J. DRUMM  3,546,788

TEACHING SYSTEM FOR CHILDREN

Filed Sept. 24, 1968  2 Sheets-Sheet 1

INVENTOR
Edward J. Drumm
by McDougall, Hersh, Scott
and Ladd
Att'ys

Dec. 15, 1970   E. J. DRUMM   3,546,788
TEACHING SYSTEM FOR CHILDREN
Filed Sept. 24, 1968   2 Sheets-Sheet 2

United States Patent Office  3,546,788
Patented Dec. 15, 1970

3,546,788
TEACHING SYSTEM FOR CHILDREN
Edward J. Drumm, Evanston, Ill., assignor to Little Learners, Inc., Chicago, Ill., a corporation of Illinois
Filed Sept. 24, 1968, Ser. No. 762,056
Int. Cl. G09b 1/00
U.S. Cl. 35—8                                        8 Claims

ABSTRACT OF THE DISCLOSURE

A teaching system for children comprising a container having a caricature secured on its inside surface. A photograph record is located in a pocket formed in the container, and the record containers instruction whereby a child listening to the record will hear the steps involved in performing an act requiring hand and finger dexterity, such as the typing of shoe laces. The caricature is provided with the means involved in performing the act such as a pair of shoes with associated laces.

---

This invention relates to a teaching construction for use by children.

It has been recognized that the average child has the ability to perform many acts requiring hand and finger dexterity. More importantly, it has been found that even relatively complicated acts can be performed at a very young age. When a child can perform acts such as tying of shoes at the age of three or four, there is a definite practical advantage for the parents of the child. In addition, it is believed that the development of these capabilities gives a child confidence so that learning ability will be increased and other skills can be mastered at a relatively young age.

It is a general object of this invention to provide a teaching system which will facilitate teaching of children, particularly with respect to acts requiring hand and finger dexterity.

It is a more specific object of this invention to provide a system for teaching children specific acts such as tying of shoes and buttoning with the learning process being of a nature which will facilitate educational growth.

It is a still further objectof this invention to provide a construction which will achieve the foregoing objects while providing enjoyment for the child to thereby further encourage development of basic motor skills.

The seand other objects of this invention will appear hereinafter and specific embodiments of the invention are shown in the accompanying drawings in which.

The construction of the instant invention generally comprises a container which is provided with a caricature secured on the inside surface of the container. The caricature may be in the form of an animal or in any other form which would tend to be attractive to children.

A phonograph record is accociated with the container, and this record includes a recital of the steps required for performing an act of hand and finger dexterity. The caricature is provided with the means necessary for performing the act. Thus, in the case of a recording containing instructions for tying shoes, the caricature is provided with a pair of shoes having eyelets and laces. The recording, which is preferably a voice purporting to be that of the caricature, will include a step-by-step reference to the shoes, eyelets and laces. The child can then follow the instructions on the recording while employing the caricature.

Figure 1:
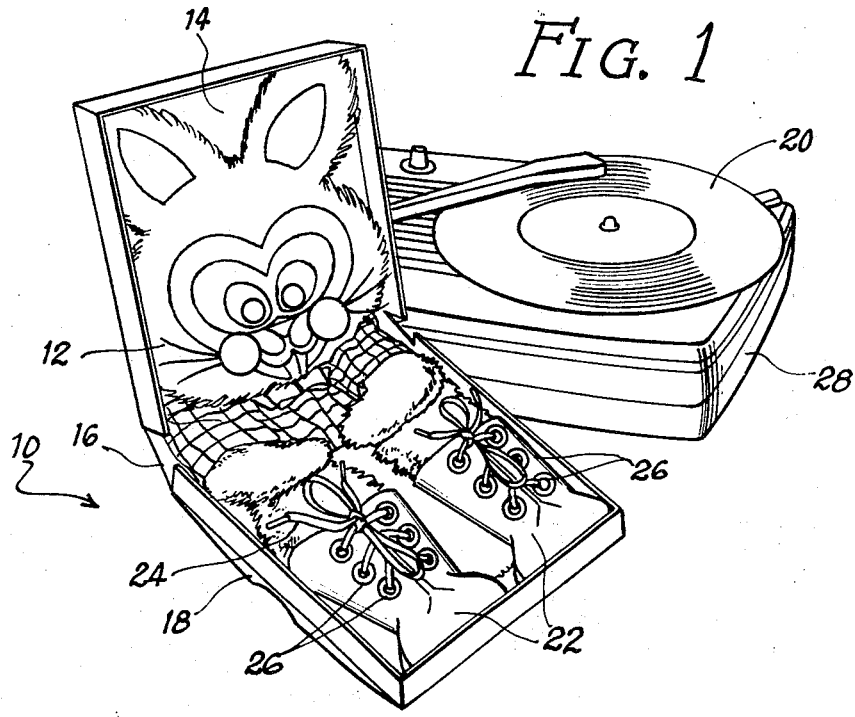
FIG. 1 is a perspective view illustrating the system of the invention.

FIG. 1 illustrates a construction 10 characterized by the features of this invention. This construction carries a caricature 12 which comprises a three-dimensional figures overlying the inside surface 14 of the container.

The container is preferably formed as a one-piece construction with score lines being formed along the edges of the central portion 16 to facilitate folding. The caricature is adapted ot be folded along with the sections so that when the sections are closed, the caricature will be confined within the container while the caricature will be exposed when the sections are opened. This provides a very compact and convenient package. In addition, securing of the caricature to the surface of the package holds the system together in a single unit to reduce the possibility of loss of any of the pieces and to reduce the chance of the wrong caricature being associated with the wrong package.

The package includes a pocket 18 which is provided by means of a sheet attached around three edges to the outside surface of one container section. The record 20 is adapted to be carried in this pocket to thereby complete the assembly of the invention.

Figure 2:
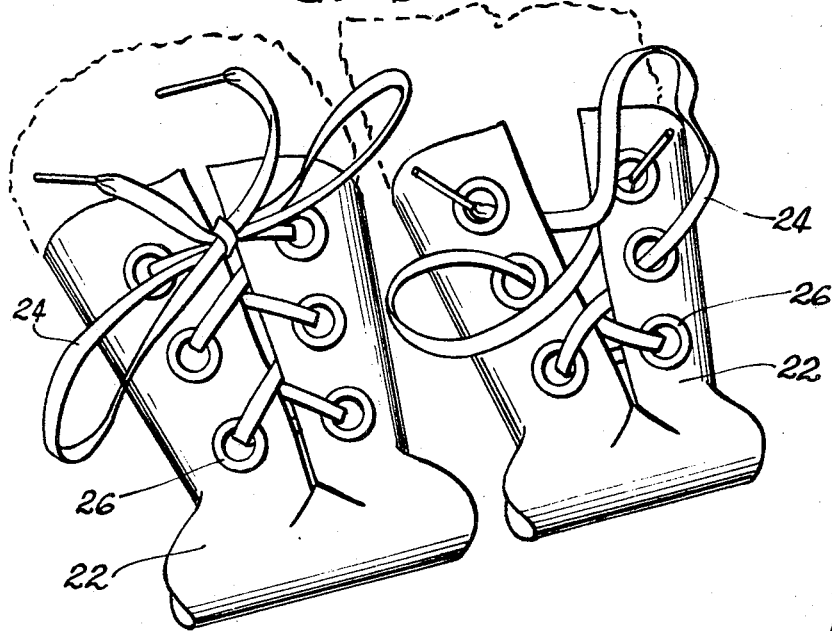
FIG. 2 is an enlarged view of shoes and associated laces employed in conjunction with the caricature of FIG. 1.

As best shown in FIG. 2, the caricature is provided with shoes 22 and laces 24 which are received by eyelets 26. In the use of the assembly, the record 20 is placed on a phonograph 28, and the child using the system will hear the record with the caricature in front of him. The record contains specific instructions regarding the means for tying shoes, and the child is told to manipulate the laces in accordance with the statements made on the record. In this connection, the laces may be divided into two connected sections with each section being of a different color to facilitate giving of the instructions.

Figure 3:
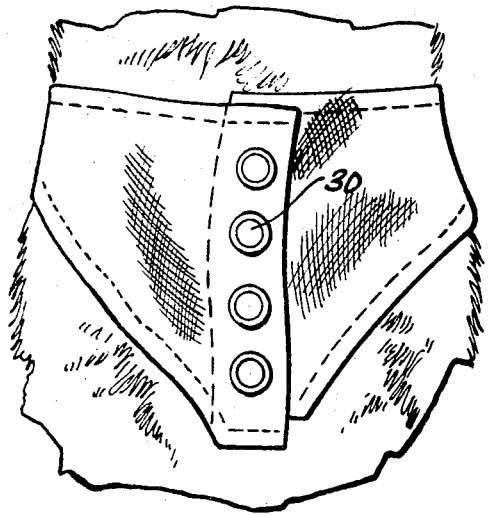
FIGS. 3 through 7 provide illustrations of alternative means for teaching motor skills.

FIGS. 3 through 7 illustrate alternative types of lessons which can be provided with the construction of the invention. In FIG. 3 snaps 30 are provided, and the record associated with this assembly will make specific reference to the steps involved in snapping and unsnapping.

Figure 4:
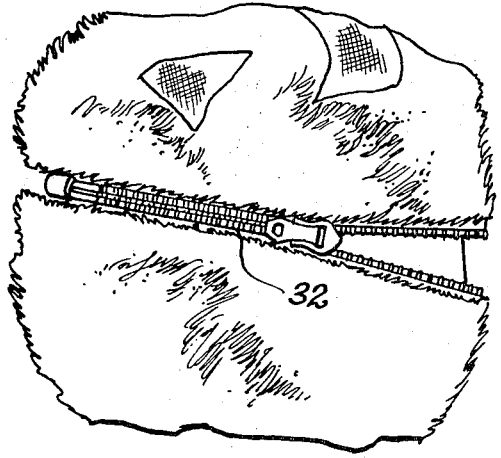
Figure 5:
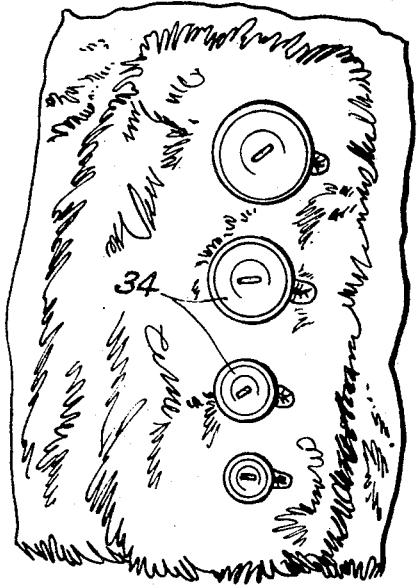
Figure 6:
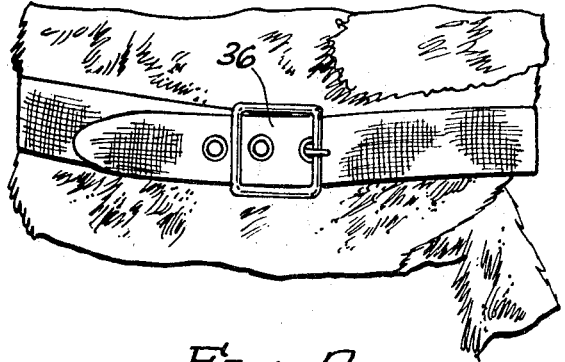
Figure 7:
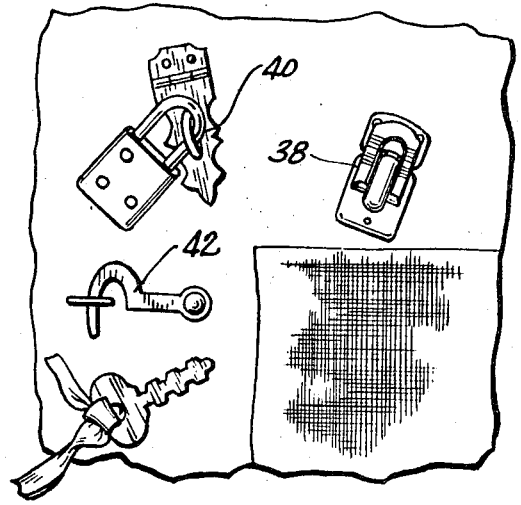

FIG. 4 illustrates zipper 32, FIG. 5 illustrates buttons 34, a buckle 36 is shown in FIG. 6, and latching means 38, 40 and 42 are shown in FIG. 7, each of these providing other alternatives. It will be noted that each of the programs referred to requires a degree of hand and finger dexterity; however, it has been found that children will accept teaching with the construction of this invention much more readily than in the case of direct instruction by an adult. Thus, even though children might tend to be frustrated because of their inexperience with the movements required, the entertainment aspect provided by the caricature and the voice on the record will tend to eliminate this problem.

It will be understood that various changes and modifications may be made in the above described construction which provide the characteristics of this invention without departing from the spirit thereof, particularly as defined in the following claims.

That which is claimed is:
1. A teaching construction comprising a container, said container defining an inner supporting surface, a caricature secured on said surface, said caricature overlying substantially the entire area defined by said surface, said container being divided into two sections and including a fold line extending across the container between said sections, said fold line traversing the area occupied by said caricature whereby said sections and portions of said caricature on opposite sides of said fold line are adapted to be folded into overlying relationship to thereby enclose said caricature between said sections, and whereby the caricature is exposed for use when the sections are unfolded, means for performing an act involving hand and finger dexterity attached to said caricature, at least one of said sections being formed from first and second sheets of material, a pocket defined between said sheets, said sheets being secured together at their edges except for one side which defines an access opening to said pocket, and a record dimensioned to be received in said pocket, the content of said record comprising a recital of the steps required of a child for performing said act.

2. A construction in accordance with claim 1 wherein said container comprises a box.

3. A construction in accordance with claim 1 wherein said caricature is provided with shoes and shoe laces with said act comprising lacing and tying.

4. A construction in accordance with claim 1 wherein said caricature carries latch-type devices with said act comprising opening and closing of the devices.

5. A construction in accordance with claim 1 wherein said caricature is provided with clothing utilizing buckle-type devices with said act comprising buckling and unbuckling of the devices.

6. A construction in accordance with claim 1 wherein said caricature is provided with zipper-type devices with said act comprising zipping and unzipping said devices.

7. A construction in accordance with claim 1 wherein said caricature is provided with snap-type devices with said act comprising snapping and unsnapping of the devices.

8. A construction in accordance with claim 1 wherein said caricature is provided with button-type devices with said act comprising buttoning and unbuttoning of the devices.

References Cited
UNITED STATES PATENTS

| | | | |
|---|---|---|---|
| 1,435,660 | 11/1922 | Rogerson | 35—1 |
| 2,275,956 | 3/1942 | Grace | 35—8 |
| 2,501,902 | 3/1950 | Howell | 35—56 |
| 2,524,143 | 10/1950 | Smith | 35—8(.1)UX |
| 2,623,303 | 12/1952 | Mindel | 35—22(.5) |
| 2,972,820 | 2/1961 | Cano | 35—56 |

WILLIAM H. GRIEB, Primary Examiner